United States Patent
Hsiao et al.

(10) Patent No.: US 6,772,282 B2
(45) Date of Patent: Aug. 3, 2004

(54) METHOD OF CONTINUOUS BURN FOR STORAGE MEDIUM

(75) Inventors: Kuan-Yuan Hsiao, Taipei Hsien (TW); Wen-Jeng Chang, Kaohsiung (TW)

(73) Assignee: Via Technologies, Inc., Taipei Hsien (TW)

( * ) Notice: Subject to any disclaimer, the term of this patent is extended or adjusted under 35 U.S.C. 154(b) by 346 days.

(21) Appl. No.: 10/035,490

(22) Filed: Oct. 22, 2001

(65) Prior Publication Data

US 2002/0166025 A1 Nov. 7, 2002

(30) Foreign Application Priority Data

May 3, 2001 (TW) ........................................ 90110587 A

(51) Int. Cl.$^7$ .......................... G06F 12/00; G11B 7/004
(52) U.S. Cl. ...................... 711/112; 710/57; 369/30.23; 369/47.33
(58) Field of Search .......................... 711/111–112, 4; 710/30, 52, 57; 369/30.23, 30.24, 47.33, 47.31–47.34

(56) References Cited

U.S. PATENT DOCUMENTS

| | | | | |
|---|---|---|---|---|
| 6,091,686 A | * | 7/2000 | Caffarelli et al. | ........ 369/53.24 |
| 6,317,809 B1 | * | 11/2001 | Kulakowski et al. | ....... 711/112 |
| 6,405,283 B1 | * | 6/2002 | James | ......................... 711/112 |
| 6,418,099 B2 | * | 7/2002 | Yamamoto | ............... 369/47.11 |
| 6,487,616 B1 | * | 11/2002 | Hayashi | ....................... 710/59 |
| 6,538,962 B2 | * | 3/2003 | Hyun | ...................... 369/30.23 |
| 2002/0145959 A1 | * | 10/2002 | Tsukihashi | ............... 369/47.29 |

* cited by examiner

Primary Examiner—Denise Tran
(74) Attorney, Agent, or Firm—J.C. Patents

(57) ABSTRACT

A continuous burn process of a storage medium, performed when the buffer is buffer under run, is disclosed. Whether the data buffer is buffer under run is firstly detected. If buffer under run is to occur to the data buffer, the currently written data block is an incomplete data block. The incomplete data block includes at least a synchronous frame and an incomplete data frame, which is the last data to be burned. The write operation is paused then. When the data in the data buffer reaches a predetermined amount, a new data is written into a superimposed data region of the incomplete data frame. The data in the data buffer is then continuously burned into the subsequent data frame adjacent to the incomplete data frame.

10 Claims, 5 Drawing Sheets

METHOD OF CONTINUOUS BURN FOR STORAGE MEDIUM

CROSS-REFERENCE TO RELATED APPLICATION

This application claims the priority benefit of Taiwan application serial no. 90110587, filed on May 3, 2001.

BACKGROUND OF THE INVENTION

1. Field of the Invention

The invention relates in general to a method of continuous burn for a storage medium, and more particularly, to a method of correctly continuous burn for data write interrupt generated to resolve a buffer under run issue.

2. Description of the Related Art

FIG. 1 shows a system structure for writing data into a storage medium. The central processing unit (CPU) 100 controls data temporarily stored in a data buffer 104 via an IDE bus 102. Meanwhile, the data previously stored in the data buffer 104 is burned into a storage medium 110 via a laser pick-up head 108. The storage time for the data in the data buffer 104 is short because at the time that the bus 102 writes the data transmitted by the CPU 100 into the data buffer 104, the data in the data buffer 104 is read and written into the storage medium 110. If the CPU 100 delays the transmission to process another operation, the data in the data buffer 104 is not enough to be written into the storage medium 100, and a write interrupt is caused. This is known as "buffer under run".

The prior art proposes two methods to resolve the above problem. One is a vari-pitch method, and the other is a burn-proof method.

Referring to FIG. 2 and FIG. 3, in the storage format of the recordable or rewritable compact disk prescribed by the orange book provided by Philip and Sony, one data block comprises 98 data frames. Each data frame comprises 588 bits of storage space, which includes 24 bits of synchronous columns (sync), 3 bits of merge columns, 14 bits of SubQ code columns, and the residual 547 bits of data columns that can really write data.

In FIG. 3, the vari-pitch method is used to resolve buffer under run. In this method, when buffer under run is to occur, a close operation is performed on the currently burned data block. That is, after the currently written data block 1 is burned into a complete data block, four run in blocks and one link block are burned for a close. The link block is an incomplete line block. Only when the data buffer is filled with data, the link data is then superimposed onto the incomplete link block. In addition, before burning the data blocks that the user can really use or access, two run out blocks have to be burned further to be able to perform the burning process for the next data block. That is, neither the run in block, the link block nor the run out block is usable data for the user, but the automatically written blocks to resolve buffer under run in the vari-pitch method.

Therefore, when buffer under run occurs to the method, the reason why an interrupt does not happen during burning data is explained as follows. Before burning a next data block, an overlap area is generated in the link block between the previous and next data blocks. The overlap area is not the written data usable or accessible to the user. Therefore, it can be superimposed, but is not to be modified, so that the interrupt between the data blocks does not occur. However, the link block, the run in block and the run out block between the data blocks in this method are so long that the data storage space of the storage medium is reduced. Consequently, the access speed of the system becomes slower.

FIG. 4 shows a burn-proof method to resolve buffer under run as proposed by Sanyo.

In the burn-proof method, before buffer under run occurs, the currently written data is burned into a complete data block as shown as the data block 1 in front of point a in FIG. 4, that is, the data written previously. When the data amount stored in the data buffer is enough to be written into the next data block, the write operation of the next data block is performed. That is, the data block 2 after the point b in FIG. 4 indicates the data block for continuous burn.

However, before burning the next data block, a gap is formed by the physic phenomenon induced by motor rotation, that is, the distance between the points a and b in FIG. 4. The gap is formed between two complete written frames instead of being located in a single frame. Since the data cannot be burned into the gap, a pitch of 40 microns is formed in a single speed burner, and a pitch of 80 microns is formed in a dual speed burner. Similarly, a pitch of 160 microns is generated in a quad-speed burner. However, according to the specification of the orange book provided by Philip and Sony, a maximum pitch of 100 microns is allowed. Once such limit is exceeded, errors occur or data cannot be accessed during the burning operation.

According to the above, redundant blocks are generated in the vari-pitch method, such that the data storage space of the storage medium is reduced, and the access speed of the compact disk is slowed down. In a high-speed operation, the burn-proof method generates a gap with a pitch over 100 microns to cause errors of the synchronous data in the synchronous column. Consequently, errors occur in the burning operation or the written data is not accessible.

SUMMARY OF THE INVENTION

The invention provides a method to resolve buffer under run without generating a gap or redundant data blocks that are not close blocks.

The invention further provides a method of continuous burn for a storage medium, in which a continuous burn is performed on the data stored in the data buffer to the storage medium.

The data structure of the storage medium includes at least a data block. The data block further comprises a synchronous frame and a plurality of data frames. The data frames are continuously arranged behind the synchronous frame in sequence. The synchronous frame and each data frame include a synchronous column and a data column, respectively.

The method of continuous burn of the storage medium includes the following steps. Whether buffer under run is to occur to the data buffer is detected. If buffer under run is to occur to the data buffer, the currently burned data block is written as an incomplete data block. The incomplete data block also comprises a synchronous frame and an incomplete data frame, which is to burn the last data.

The burn operation is paused then. When the data amount in the data buffer reaches a predetermined value, the new data is burned into a superimposed data region of the incomplete data frame. The data in the data buffer is then continuously burned into a subsequent data frame adjacent to the incomplete data frame.

The superimposed data region can be located in any position of the data column of the incomplete data frame.

In the burn operation, when the burning system of storage medium includes a synchronous protection mechanism, the superimposed data region can be located at any position of the data frame apart from the synchronous frame in the data block.

When the incomplete data frame is located in a specified position of the data block, the superimposed data region is located at any position after the synchronous column.

Both the foregoing general description and the following detailed description are exemplary and explanatory only and are not restrictive of the invention, as claimed.

DESCRIPTION OF THE PREFERRED EMBODIMENTS

The following description is related to a continuous burn method for a storage medium when buffer under run is to occur thereto.

Figure 1:
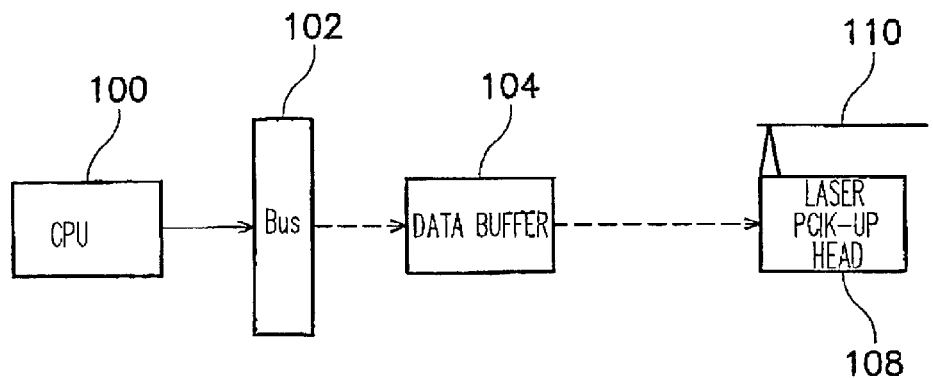
FIG. 1 shows a system structure for burning data into a storage medium.
Figure 2:
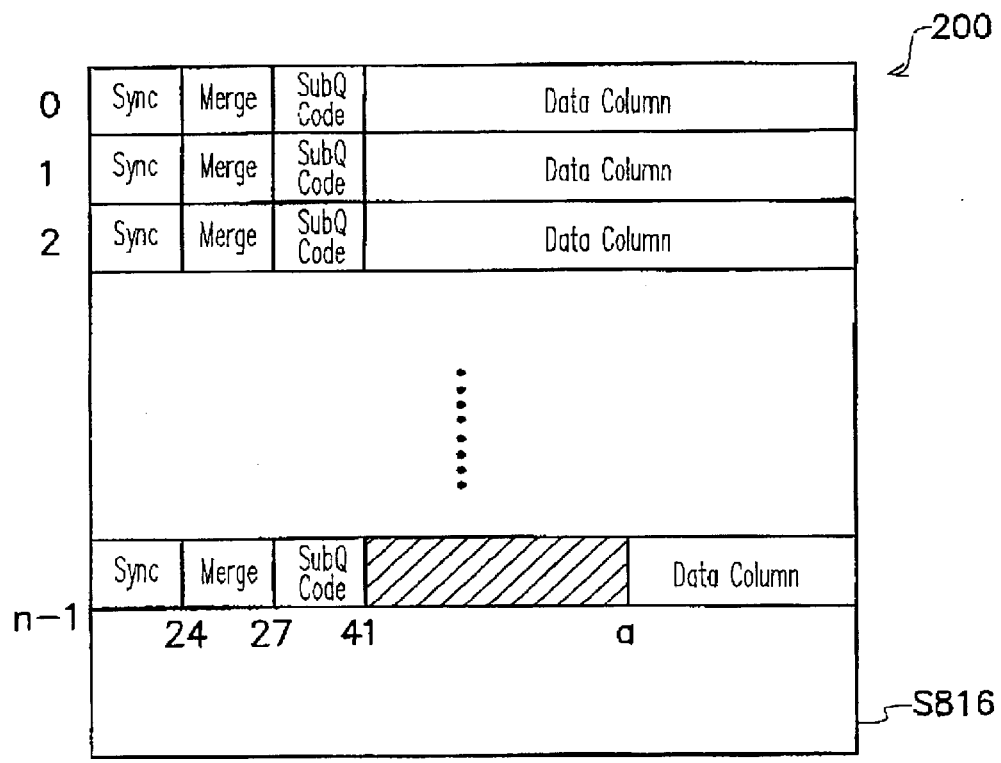
FIG. 2 shows a structure of a storage medium.
Figure 3:
FIG. 3 shows a conventional burning method.
Figure 4:
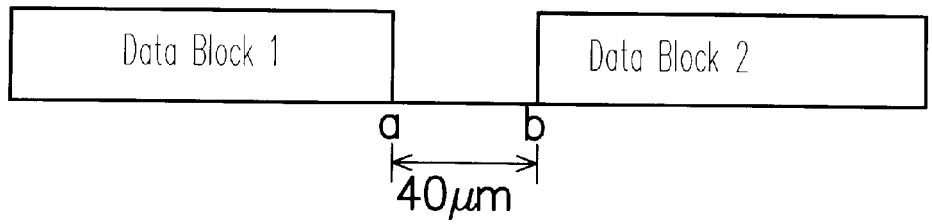
FIG. 4 shows another conventional burning method.

Referring to FIGS. 1 and 2, the data structure of the storage medium in FIG. 1 comprises at least one data block, such as the data block 200 as shown in FIG. 2. Each data block comprises at least synchronous frames such as synchronous frames 0 and 1 and data frames such as data frames 2, 3, . . . , with a total number of 96. The formats of the synchronous frames and the data frames are substantially the same. However, different names are given for the convenience of distinguishing. In a data frame, the initial synchronous frames 0 and 1 are used to indicate the initial position of the data block. Each data frame is arranged subsequent to the synchronous frame 1 in a specified order.

Each of the synchronous frames 0, 1 and the data frames further comprises at least a synchronous column (sync) and a data column (data). The data burned or stored in each data block is accessible or usable for the user.

Figure 5:
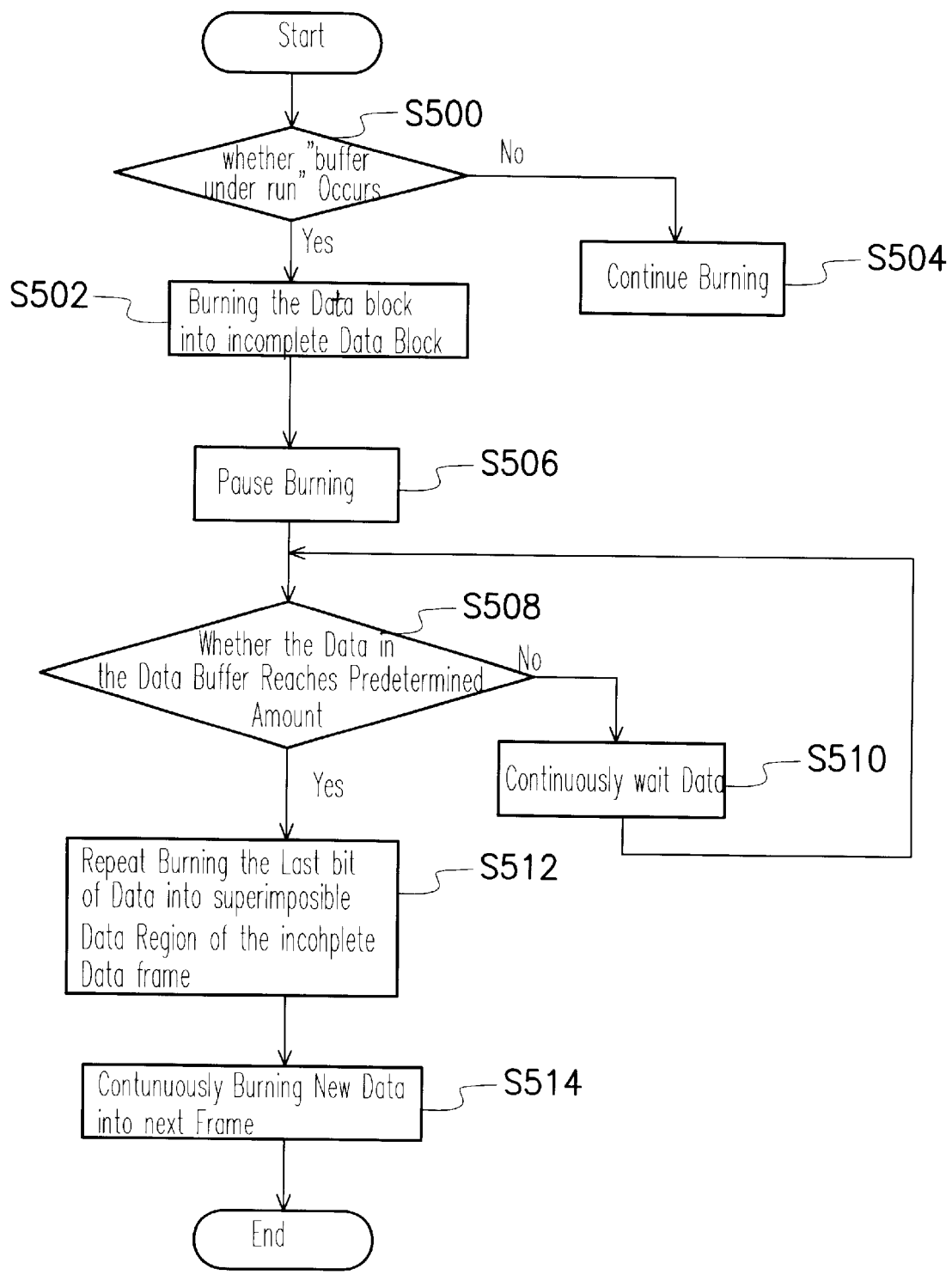
FIG. 5 is a flow chart showing an embodiment of the invention.
Figure 6:
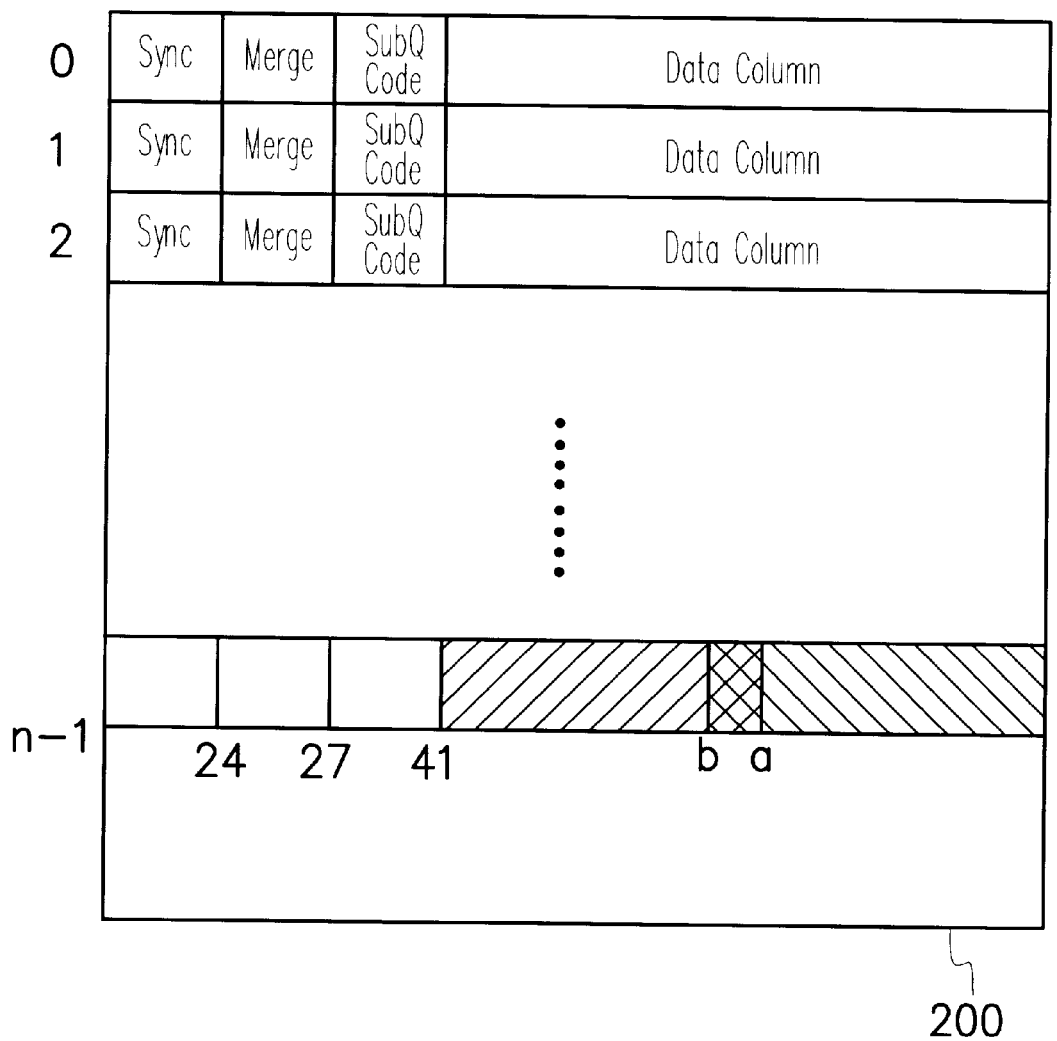
FIG. 6 schematically shows an embodiment of the invention.

Referring to FIGS. 5 and 6, a method of continuous burn of a storage medium is illustrated. In step s500, whether buffer under run is to occur to the data buffer 104 is detected. If buffer under run is not to occur, the data is continuously burned in step s504. If it is detected that buffer under run is to occur, the currently burned data block is written as an incomplete data block in step s502, such as the incomplete data block 200 as shown in FIG. 2. The incomplete data block 200 comprises at least the synchronous frames 0, 1 and the incomplete data frame n-1. The hatched portion of the incomplete data frame n-1 is the last data burned currently. The incomplete data frame n-1 can be any data frame of the incomplete data block.

In step s506, the burn operation is paused. In step s508, whether the data amount in the data buffer 104 reaches a predetermined value is detected. That is, whether the data amount of the data buffer 104 reaches the amount able to be burned into the storage medium 110 is detected. If the predetermined value is not reached, the process goes to step s510 to wait for data continuously and back to step s508 to detect whether the data amount reaches the predetermined value again. If the predetermined value is reached, new data is burned in a superimposed data region of the incomplete data frame n-1 in step s512. In step s514, the data in the data buffer 104 is continuously burned into the next data frame adjacent to the data frame n-1.

The superimposed data region writes the new data into any position of the data column of the incomplete data frame n-1. In FIG. 6, the superimposed data region is defined. The written data in front of the point a is the last data burned previously, while the written data after the point b is the newly written data. That is, data are superimposed between points a and b. The section between the points a and b is the superimposed data region of the last two data. The position of the point a is selected after the $41^{st}$ bit of the incomplete frame. That is, the incomplete frame has to comprise at least 24 bits of synchronous columns, 3 bits of merge columns, 14 bits of subQ code columns, and a plurality of data frames. The selection of the position for point b does not overlap with the synchronous column, the merge column and the subQ code column. Only the data column can be overlapped or superimposed, while the synchronous columns, the merge columns and the subQ code columns are not superimposed substantially.

Figure 7:
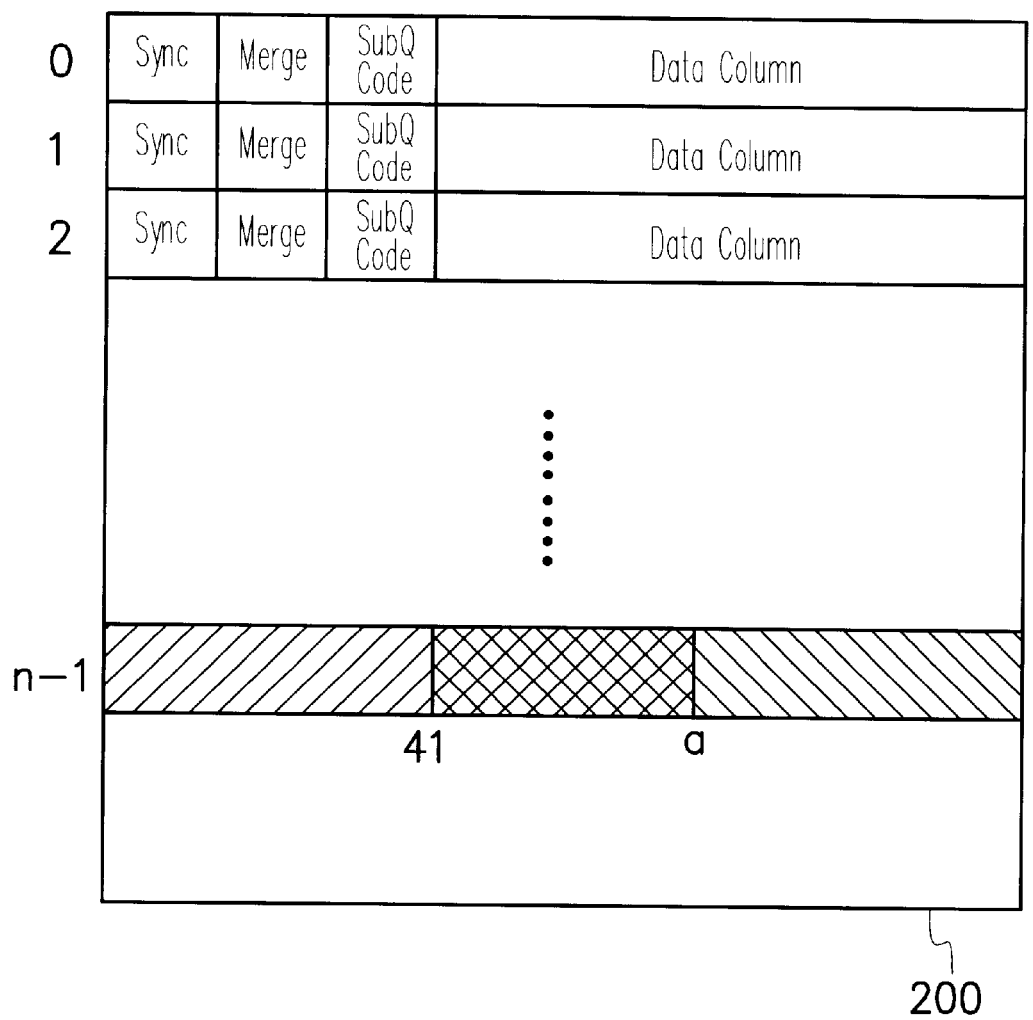
FIG. 7 is a schematic drawing of an embodiment of the invention.

In the burn operation with synchronous protection mechanism, the superimposed data region can be located in any of the data frames of the data block except the synchronous frames 0 and 1. In FIG. 7, the newly burned data can be written into the synchronous column or any position afterwards in the data frame n-1.

Errors may occur to the data in superimposed data region due to superimposition. However, the superimposed data region with errors does not exceed the length of one data frame. Furthermore, cross-interleave Reed-Solomon code (CIRC) is used to perform error detection, correction and cross-interleave resolving operation, so that the data with the length of a data frame is corrected. The superimposed data region with errors can be corrected with the correct data.

Referring to FIGS. 5 and 7, another embodiment of a method of continuous burn for storage medium according to the invention is illustrated. In this method, each data frame further comprises a subQ code column after the synchronous column.

The method comprises the following steps. In step s500, whether buffer under run is to occur to the data buffer is detected. If buffer under run is not to occur, the data is continuously burned in step s504. If it is detected that buffer under run is to occur, the currently burned data block is written as an incomplete data block in step s502, such as the incomplete data block 200 shown in FIG. 2. The incomplete data block 200 comprises at least the synchronous frames 0, 1 and the incomplete data frame n-1. The hatched portion of the incomplete data frame n-1 is the last data burned currently. The incomplete data frame n-1 can be any data frame of the incomplete data block.

In step s506, the burn operation is paused. In step s508, whether the data amount in the data buffer 104 reaches a predetermined value is detected. That is, whether the data amount of the data buffer 104 reaches the amount able to be burned into the storage medium 110 is detected. If the predetermined value is not reached, the process goes to step s510 to wait for data continuously and back to step s508 to detect whether the data amount reaches the predetermined value again. If the predetermined value is reached, new data is burned in a superimposed data region of the incomplete data frame n-1 in step s512. In step s514, the data in the data buffer 104 is continuously burned into the next data frame adjacent to the data frame n-1.

The superimposed data region can be located at any position after the synchronous frame and the merge frame of incomplete data frame. When the incomplete data frame n-1 is located at a specified position in the data block 200, such as the $24^{th}$, $25^{th}$ and $26^{th}$ data frames, the data in the subQ code column is insignificant and can be ignored.

FIG. 7 illustrates the position of the superimposed data region. The data written before the point a and after the $41^{st}$ bit is the previously written data, and the data written after the $27^{th}$ bit is the newly burned data. The section between the $27^{th}$ bit and the point a is the superimposed data region of these two data.

Errors may occur to the data in this region. However, the maximum length of the erroneous superimposed data region does not exceed the length of one data frame. A cross-interleave Reed-Solomon code can be used to perform error detection, correction and cross-interleave solving operation on the erroneous data frame to correct the data with the length of one data frame. The erroneous superimposed data region can be corrected.

In the above embodiment, the storage medium includes CD-R (CD-recordable) or CD-RW (CD-rewritable).

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A method of a continuous burn for a storage medium, related to a continuous burn to a data buffer, wherein a data structure of the storage medium comprises a data block, which further comprises at least a synchronous frame and a plurality of data frames arranged sequentially subsequent to the synchronous frame, and each of the synchronous frame and the data frames comprises a synchronous column and a data column, the method comprising:

detecting whether buffer under run occurs to the data buffer;

burning a data block, the data block being burned as an incomplete data block when buffer under run occurs, wherein the incomplete data block comprises a synchronous frame and an incomplete data frame and the incomplete data frame includes a last written data;

pausing the burning step;

burning new data into a superimposed data region of the incomplete data frame when a data amount of the data buffer reaches a predetermined data amount; and performing a continuous burn on the data stored in the data buffer into the data frames adjacent to the incomplete data frame.

2. The method according to claim 1, wherein the data block stores data usable to a user.

3. The method according to claim 1, wherein the synchronous frame specifies an initial position of the data block.

4. The method according to claim 1, wherein the incomplete data frame includes any data frame in the incomplete data block.

5. The method according to claim 4, wherein the superimposed data region is located in any position of the data column of the incomplete data frame.

6. The method according to claim 4, wherein each of the data frames further includes a subQ code column located after the synchronous column.

7. The method according to claim 6, wherein the superimposed data region of the incomplete data frame is located in any position after the synchronous column.

8. The method according to claim 4, wherein the superimposed data region of the incomplete data block is located in any position of any data frame except the synchronous frame in the data block when a synchronous protection mechanism is applied.

9. The method according to claim 1, wherein the storage medium includes a writable CD.

10. The method according to claim 1, wherein the storage medium includes a rewritable CD.

* * * * *